(12) United States Patent
Caudill et al.

(10) Patent No.: US 7,268,308 B1
(45) Date of Patent: Sep. 11, 2007

(54) ISOLATION SWITCH FOR POWER TRANSFER

(76) Inventors: Willie Sam Caudill, 7516 Doral Dr., Tobaccoville, NC (US) 27050; Gary Wayne Cook, 320 Grand St., Winston-Salem, NC (US) 27107

( * ) Notice: Subject to any disclaimer, the term of this patent is extended or adjusted under 35 U.S.C. 154(b) by 166 days.

(21) Appl. No.: 11/120,085

(22) Filed: May 2, 2005

Related U.S. Application Data

(60) Provisional application No. 60/633,719, filed on Dec. 6, 2004.

(51) Int. Cl.
*H01R 9/20* (2006.01)

(52) U.S. Cl. .................................... 200/50.35

(58) Field of Classification Search ............ 200/50.32, 200/50.33, 50.35, 50.4, 50.34; 307/64
See application file for complete search history.

(56) References Cited

U.S. PATENT DOCUMENTS

| 385,826 | A | | 7/1888 | Sechrist |
| 1,213,073 | A | | 1/1917 | Carr |
| 1,557,394 | A | | 10/1925 | Anderson |
| 1,561,303 | A | | 11/1925 | Baxter |
| 1,609,223 | A | | 11/1926 | Trumbull |
| 1,617,040 | A | | 2/1927 | Zimmer |
| 1,638,828 | A | | 8/1927 | Carling |
| 1,652,541 | A | | 12/1927 | Neil |
| 1,664,380 | A | | 3/1928 | Meyers |
| 1,795,434 | A | | 3/1931 | Leppert |
| 2,479,266 | A | | 8/1949 | Rowe ..................... 200/67 |
| 2,807,684 | A | | 9/1957 | Ayers ..................... 200/67 |
| 3,134,877 | A | | 5/1964 | Ericson |
| 3,158,701 | A | | 11/1964 | Nadeau ................... 200/50 |
| 3,246,100 | A | | 4/1966 | Russell ................... 200/92 |
| 3,369,100 | A | | 2/1968 | Kussy et al. ............. 200/172 |
| 3,432,628 | A | | 3/1969 | Puetz ..................... 200/50 |
| 3,492,448 | A | | 1/1970 | Phillips, Jr. .............. 200/50 |
| 3,510,612 | A | * | 5/1970 | Ward .................... 200/50.33 |
| 3,647,997 | A | * | 3/1972 | Nerem ................... 200/50.33 |
| 3,654,484 | A | | 4/1972 | Jorgenson et al. ......... 307/149 |
| 3,705,280 | A | | 12/1972 | Harms .................... 200/50 |
| 3,767,872 | A | * | 10/1973 | Whitchurch ............. 200/50.33 |
| 3,778,633 | A | * | 12/1973 | DeVisser et al. ........... 307/64 |
| 3,789,169 | A | * | 1/1974 | Yazvac ................... 200/50.4 |
| 3,801,758 | A | * | 4/1974 | Shand et al. ............ 200/50.33 |
| 3,936,782 | A | * | 2/1976 | Moakler et al. ............ 335/161 |
| 4,034,170 | A | | 7/1977 | Raabe et al. .............. 200/50 |
| 4,113,334 | A | * | 9/1978 | Instone ..................... 439/96 |

(Continued)

OTHER PUBLICATIONS

"Guide to Installing a Standby Backup Generator," Dakota Electric Association.

(Continued)

*Primary Examiner*—Neil Abrams
(74) *Attorney, Agent, or Firm*—MacCord Mason PLLC

(57) ABSTRACT

A power system including a power transfer device that prevents a common load from at once being powered by a main and auxiliary power source, and eliminates any possibility of back feeding the main power source from the auxiliary power source. First and second circuit breakers are mounted side by side in reversely positioned relationship and have handles joined by a coupler, so that movement of the coupler in either direction opens one circuit breaker and closes the other one.

16 Claims, 4 Drawing Sheets

U.S. PATENT DOCUMENTS

| | | | | |
|---|---|---|---|---|
| 4,270,031 A * | 5/1981 | Borona et al. | ............ | 200/50.33 |
| 4,510,357 A | 4/1985 | Winterbottom | ............... | 200/50 |
| 4,590,387 A | 5/1986 | Yoshida et al. | ............... | 307/64 |
| 4,724,512 A | 2/1988 | Bischof et al. | .............. | 361/357 |
| 4,760,278 A | 7/1988 | Thomson | ...................... | 307/64 |
| 4,791,255 A | 12/1988 | Eliezer | ....................... | 200/144 |
| 4,827,089 A | 5/1989 | Morris et al. | .................. | 200/50 |
| 4,902,859 A | 2/1990 | Witzmann et al. | ............. | 200/50 |
| 4,924,041 A | 5/1990 | Yee | ............................ | 200/50 |
| 4,999,598 A | 3/1991 | Jannesari et al. | ............ | 335/122 |
| 5,008,499 A | 4/1991 | Yee et al. | ....................... | 200/50 |
| 5,397,868 A | 3/1995 | Smith et al. | .................... | 200/18 |
| 5,422,453 A | 6/1995 | Smith et al. | ................. | 200/329 |
| 5,648,646 A | 7/1997 | Flegel | ...................... | 200/50.32 |
| 5,725,085 A | 3/1998 | Seymour et al. | ......... | 200/50.33 |
| 5,761,027 A | 6/1998 | Flegel | ........................ | 361/664 |
| 5,790,369 A | 8/1998 | Sitler | ......................... | 361/643 |
| 5,814,777 A * | 9/1998 | Green et al. | ............. | 200/50.33 |
| 5,914,467 A | 6/1999 | Jonas et al. | ..................... | 200/1 |
| 5,977,492 A | 11/1999 | Taylor et al. | ............ | 200/50.32 |
| 6,031,193 A | 2/2000 | Flegel | ...................... | 200/50.33 |
| 6,069,328 A | 5/2000 | Oravetz et al. | .......... | 200/50.33 |
| 6,096,986 A | 8/2000 | Flegel | ...................... | 200/50.33 |
| 6,169,340 B1 | 1/2001 | Jones | .......................... | 307/64 |
| 6,180,897 B1 | 1/2001 | Montague et al. | ....... | 200/50.35 |
| 6,184,595 B1 | 2/2001 | Flegel, Jr. | .................... | 307/114 |
| 6,521,849 B1 | 2/2003 | Flegel | ...................... | 200/50.32 |
| 6,538,223 B1 | 3/2003 | Yoshida et al. | ............. | 200/401 |
| 6,541,719 B1 | 4/2003 | Powell | ..................... | 200/50.32 |
| 6,570,269 B2 | 5/2003 | McMillan et al. | ............ | 307/64 |
| 6,621,689 B1 | 9/2003 | Flegel | ........................ | 361/631 |
| 6,680,445 B1 | 1/2004 | Oravetz et al. | ........... | 200/50.33 |
| 6,815,623 B1 | 11/2004 | Holland | ................... | 200/50.32 |
| D499,700 S | 12/2004 | Raabe et al. | ............... | D13/160 |
| 6,861,596 B2 | 3/2005 | Schnackenberg | ......... | 200/43.01 |
| 7,005,590 B1 * | 2/2006 | Willis | ...................... | 200/50.32 |

OTHER PUBLICATIONS

"How to Operate a Portabel Generator Safely," North Carolina's Electric Cooperatives.
"2005 NEC Changes Summmary Articles 700 through 702".
"Safely Installing your Standby Electric Generator," Flathead Elective Cooperative, Inc.

* cited by examiner

ISOLATION SWITCH FOR POWER TRANSFER

This application claims the benefit of U.S. Provisional Application No. 60/633,719, filed Dec. 6, 2004.

BACKGROUND OF THE INVENTION

The present invention relates to a power system including a power transfer device that prevents a common load from at once being powered by a main and auxiliary power source, and eliminates any possibility of back feeding the main power source from the auxiliary power source.

Reliance on electrical power in homes and industry causes power outages resulting from breakdowns in electrical utility equipment to become aggravating and oftentimes costly to varying degrees. The frequency of disruptions in utility electrical service has resulted in the popularity of standby generating equipment to supply at least critical load circuits. To accommodate these alternative electrical sources supplying common electrical load circuits, a power transfer switch is usually used. Such a transfer switch is normally conditioned to connect the utility source to the common load circuits, while maintaining generating equipment disconnected on standby. Upon the occurrence of a power outage, the transfer switch is thrown, either automatically or manually, to first disconnect the utility or main source and then connect the standby source or generator to the common load circuits. Obviously, precaution must be taken to ensure that the two sources can never be simultaneously connected to the common load circuits. In addition, where an auxiliary power source feeds an existing load center normally powered by a utility, the possibility of back feeding the utility with a generator through a common or neutral return conductor from the utility may exist, posing a safety hazard to utility workers dispatched to repair damaged power lines. Thus, there is a need for a power system that includes a power transfer device that prevents a common load from simultaneously being powered by a main and auxiliary power source, and eliminates any possibility of back feeding the main power source from the auxiliary power source.

SUMMARY OF THE INVENTION

The invention is generally directed to a power system including a power transfer device that prevents a common load from simultaneously being powered by a main and auxiliary power source, and eliminates any possibility of back feeding the main power source from the auxiliary power source by completely isolating the main power source when the load is powered by the auxiliary power source.

Accordingly, in an embodiment of the invention, the power system includes a power transfer device, which in turn includes a pair of adjacent multiple pole switches, such as circuit breakers. Each of the circuit breakers includes multiple pairs of opposing terminals and a breaker switch movable in one direction to produce an electrical connection between each of the opposing pairs of terminals. The ON and OFF ends of each breaker are reversed with respect to the adjacent breaker. A coupler gangs the breaker switches to close electrical circuits through one of the breakers and open circuits through the adjacent breaker when the coupler is moved to change power sources.

In another embodiment of the invention, the power system includes an electrical load, a main power source, an auxiliary power source, and a power transfer device. The power transfer device includes a first three pole circuit breaker including a first breaker switch movable in one direction to produce an electrical connection between three opposing pairs terminals, a second three pole circuit breaker including a second breaker switch movable in an opposite direction to produce an electrical connection between each of the three opposing pairs of terminals of the second breaker, and a coupler between the first and second breaker switches.

These and other embodiments of the invention will become apparent to those skilled in the art after a reading of the following description of the preferred embodiment when considered with the drawings.

DESCRIPTION OF THE PREFERRED EMBODIMENTS

The drawings and descriptions are for the purpose of describing preferred embodiments of the invention and are not intended to limit the invention to the embodiments shown and described. Those of ordinary skill will recognize that the invention is capable of various and numerous embodiments.

Figure 1:
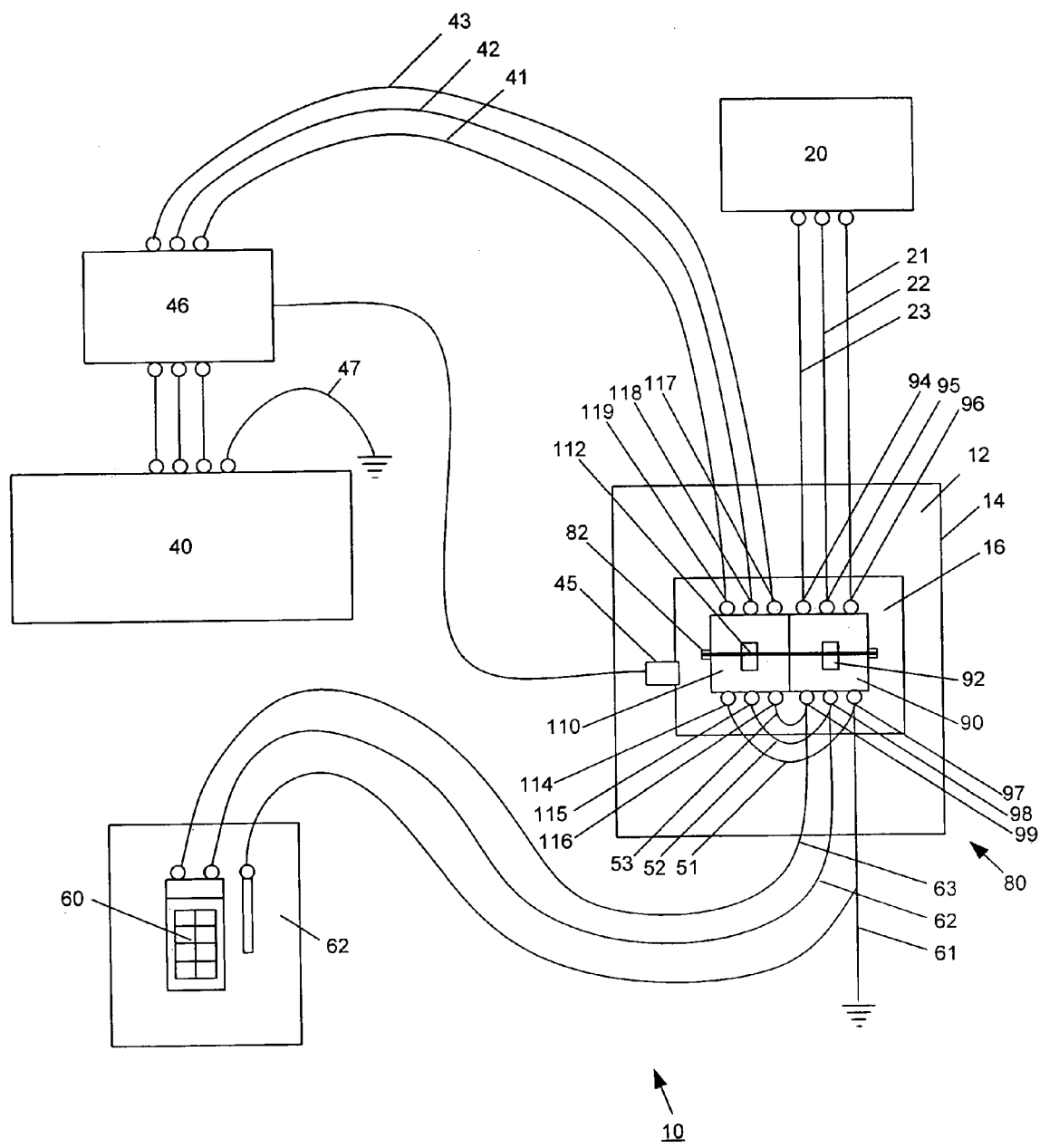
FIG. 1 is a diagram of a power system according to an embodiment of the invention.

Accordingly, FIG. 1 shows a power system 10 constructed according to one embodiment of the invention. The power system 10 includes an electrical load 60 serviced by a load center 62 to which power is supplied by either a main 20 or auxiliary power source 40. The load center 62 typically includes a box with a plurality of circuit breakers taking currents off an input bus and distributing the current to individual circuits, such as lights, stores, receptacles, etc. The main power source 20 can be a utility power source and the auxiliary power source 40 can be a stand by generator 40, for example, having a main disconnect 46 between it and the electrical load 60. The power system 10 also includes a power transfer device 80 for switching the electrical load 60 between the main 20 and auxiliary power source 40.

FIG. 1 also shows the construction of an embodiment of the power transfer device 80 that takes the form of a pair of adjacent three pole circuit breakers 90 and 110 affixed to a common mounting pan 16, which is in turn mounted to the back wall 12 of a housing 14 at least partially enclosing the power transfer device 80. In an alternative embodiment, the breakers 90 and 110 can be mounted to a housing in common with the load center 62 providing the electrical load 60. Each of the breakers 90 and 110 includes a switch 92 and 112 movable towards one of two opposing ends of the breaker 90 or 110 to its ON position, and toward the opposite end to an OFF position. The breakers 90 and 110 are disposed alongside one another with their respective ON and OFF ends reversed, such that moving both switches 92 and 112 in the same direction moves one switch 92 or 112 to its ON position and the switch 92 or 112 of the adjacent breaker 90 or 110 to its OFF position. The breakers 90 and 110 can be UL approved or newly fabricated and should meet or exceed the current carrying requirements of the load center 62.

In the embodiment of the invention shown in FIG. 1, one end of the circuit breaker 90 to the right includes three line terminals 94, 95, and 96, each corresponding to a load terminal 97, 98, or 99 at the opposite end of the breaker 90. The adjacent circuit breaker 110 likewise includes three load terminals 114, 115, and 116 at one end, with each of the three corresponding to an opposing line terminal 117, 118 or 119 at the opposite end of the breaker 110. The power transfer device 80 includes a coupler 82 connecting the breaker switches 92 and 112 such that both must move together in the same direction. The switches 92 and 112 preferably include spring biased, conventional over the center operating handles such that when coupler 82 is not being moved to change their position, one switch 92 or 112 remains in its ON position and the other 92 or 112 in its OFF position. Moving the coupler 82 first opens both breakers 90 and 110 and then closes one 90 or 110 while leaving the other 90 or 110 open. The circuit breakers 90 and 110 can be mounted such that the switches 92 and 112 are slightly offset to assure a make-before-break power transfer device 80. In the embodiment of the invention shown in FIG. 1, a solenoid 45 powered by the auxiliary power source 40 is configured to turn one switch 112 ON and the adjacent switch 92 OFF. The solenoid could also be powered by a button or the switches can be thrown by hand.

In the embodiment of the invention shown by FIG. 1, two 110V power cables 22 and 23 from the main power source 20 are connected to two of the line terminals 94 and 95 and two corresponding load terminals 99 and 98 of one of the circuit breaker 90 such that when the switch 92 is ON, the cables 22 and 23 provide power through the breaker 90 to the electrical load 60 at the load center 62. A ground conductor 21 is connected to the other line terminal 96 and load terminal 97 of the breaker 90, and grounded on the load side of the breaker 90. The auxiliary power source 40 also includes a grounded line 47 that can be joined with the ground 61 connected to the terminal 97 of the breaker 90. The ground conductor 21 from the main power source 20 is not connected to the electrical load 60. Thus, when the breaker 90 is open or OFF, the main power source 20 is completely isolated from the electrical load 60, and there is no possibility of back feeding the main power source 20 from the auxiliary power source 40 through the neutral or common return conductor.

In the preferred embodiment of the invention, two insulated 110V power cables 42 and 43 and a ground conductor 41 from the auxiliary power source 40 are connected to the line terminals 117, 118 and 119 of the adjacent circuit breaker 110. Three cables 51, 52 and 53 connect the line terminals 114, 115 and 116 of this breaker 110 to the load terminals 97, 98 and 99 of the circuit breaker 90, respectively. These are in common with power cables 62 and 63 to the electrical load 60 and the grounded line 61 such that the auxiliary power source 40 and the main power source 20 can alternatively supply the electrical load 60 through the load center 62, depending on the position of the coupler 82, and thus the switches 92 and 112 of the circuit breakers 90 and 110.

Figure 2:
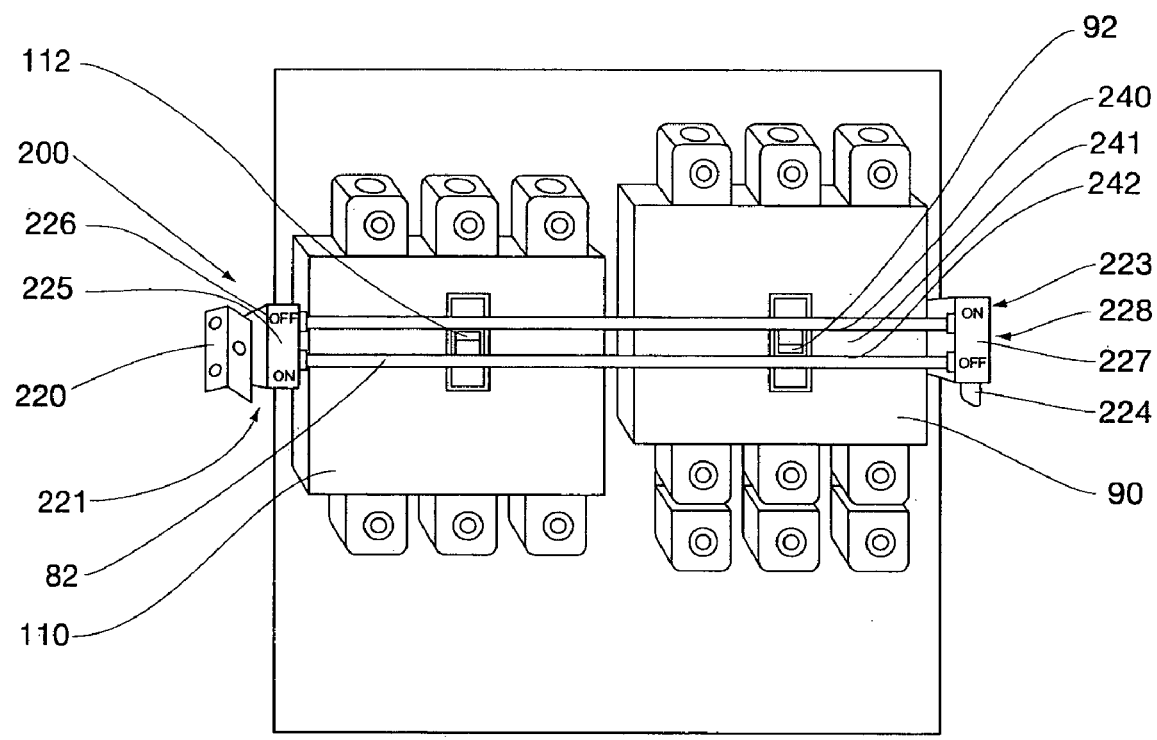
FIG. 2 is a front view of a power transfer device constructed according to an embodiment of the invention.

FIG. 2 is a front perspective view of the circuit breakers 90 and 110 and the coupler 82 of an embodiment of the invention. A bracket 220 is affixed to the mounting pan 16 aside the breaker 110 and another 222 (partially hidden from view by the circuit breaker 90) aside the adjacent breaker 90, substantially identical to the bracket 220. Extending upwardly from and pivotally mounted to each bracket 220 and 222 is an arm 221 and 223. Each arm 221 and 223 includes a substantially planar rectangular portion 225 and 227 at its top extending substantially perpendicularly to an upwardly extending portion 226 and 228. Indicators at a top and bottom region of the rectangular portions 225 and 227 of the arms 226 and 228 mark the ON and OFF directions of the nearest breaker switch 90 or 112 to each arm 221 and 223. Two bars 240 and 242 are coupled at each end to the arms 221 and 223 extending transverse the opposing terminals of the breakers 90 and 110 with an opening 241 between them. The switches 92 and 112 of the circuit breakers 90 and 110 extend outwardly with a portion of each disposed between the two bars 240 and 242 in the opening 241 such that, preferably, at least one of the bars 240 or 242 slidably engages the upper or lower surfaces of both switches 90 and 110 as the coupler moves to change the position of the switches 92 and 112. In the preferred embodiment of the invention, the opening 241 between the bars 240 and 242 is slightly larger than the portion of the switches 92 and 112 between them 240 and 242. This construction permits the switches 92 and 112 to be either substantially laterally disposed, or slightly offset from being laterally disposed with respect to one another to provide an increased delay time in a break-before-make configuration of the breakers 90 and 112. While a make-before-break configuration is contemplated, it is not at present preferred. In the embodiment of the invention shown in FIG. 2, the breaker switch 112 is offset slightly lower than the switch 92 to provide an increased delay time between termination of the connection between the terminals of one of the breakers 90 or 110 and the connection of the terminals of the other breaker 90 or 110.

Figure 3:
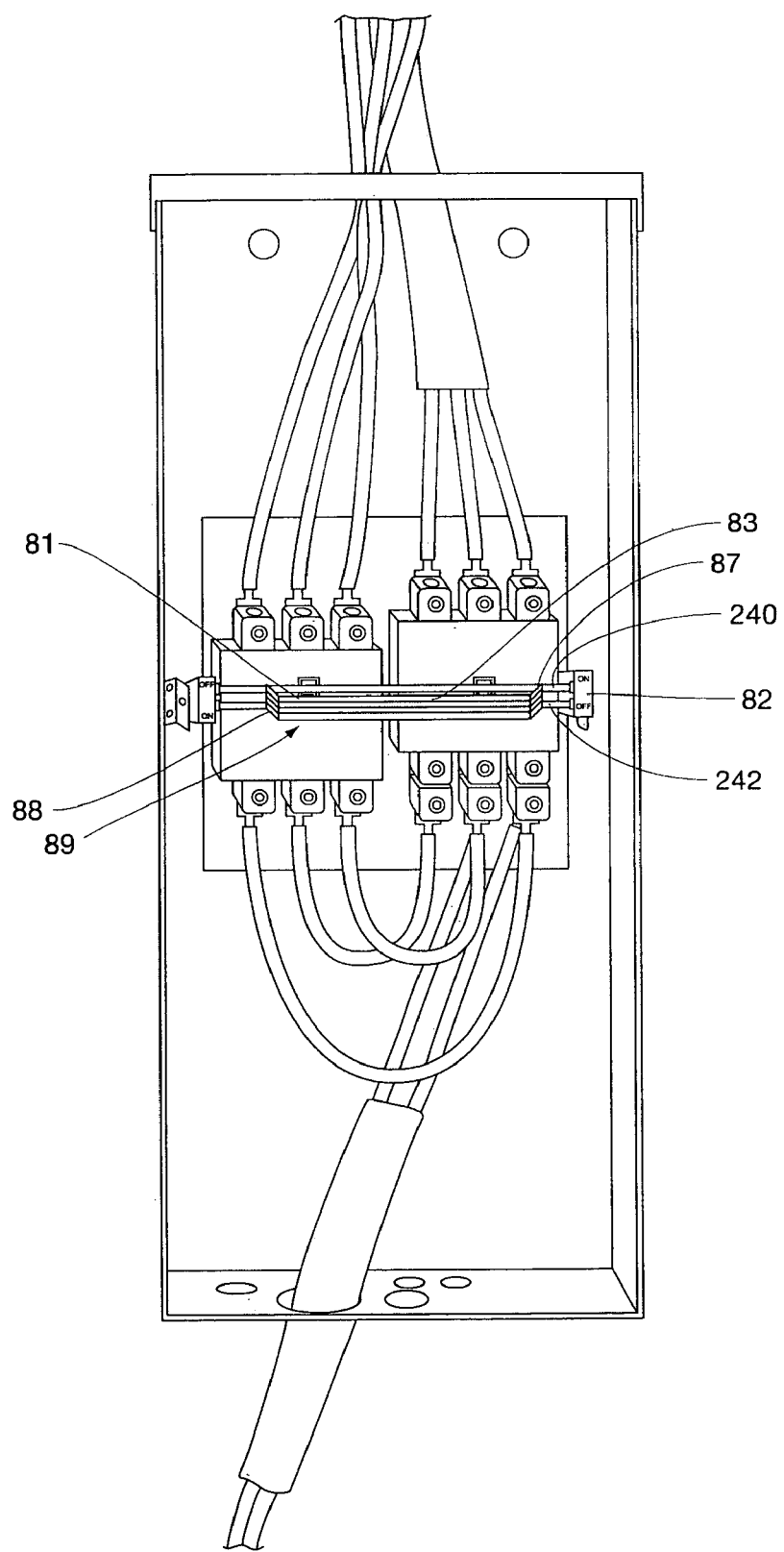
FIG. 3 is a front perspective view of the power transfer device constructed according to an embodiment of the invention.
Figure 4:
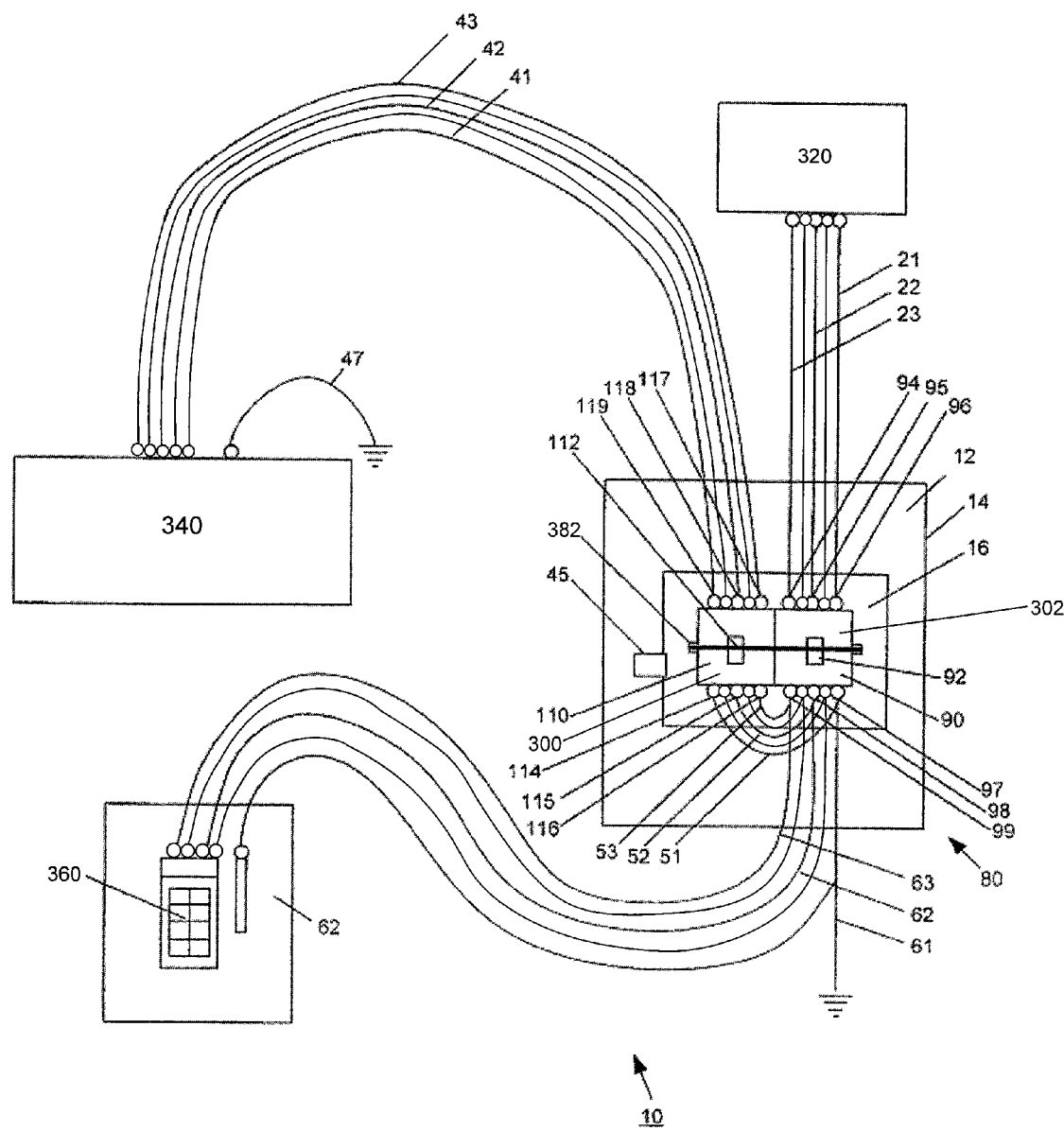
FIG. 4 shows a schematic diagram of an isolation switch for a power transfer device including first and second switches 300,302 disposed with lateral sides adjacent one another, each switch having a sufficient number of poles to convey power, neutral and ground from power supply 320, 340 to a load 360. A linkage 382 between the first and second switches is configured such that closing one switch opens the other switch with a period of time during closing when all poles of both switches are open. The number of poles for each switch is five, so that three phase power, neutral and ground poles are provided.

FIG. 3 is a front view of an embodiment of the invention including a handle 81 connected to the coupler 82 for moving the breaker switches 90 and 110. The handle 81 is a frontward projecting member connected at opposite ends to the two transversely extending bars 240 and 242. The member 81 includes a body portion 83 having a leg 87 and 88 connected at each lateral end and extending towards the front of the breakers 90 and 110 from the body portion 83 of the handle 81 to a connection to the two bars 240 and 242, which forms an opening 89 (partially hidden from view by the handle 81 in FIG. 3) between the handle 81 and the two bars 240 and 242 of the coupler 82.

Preferred embodiments provide the following advantages:
Break-before-make power transfer switch meeting the National Electrical Code/Underwriters Laboratory (NEC/UL) requirements for both residential and commercial use to switch between primary and secondary (back-up) power source.
Physical and spatial displacement to create electrical contact time-delay.
Eliminates the possibility of any current on either the hot, neutral, or ground from the standby generator being back fed to the main power source.
Versatile fabrication utilizing either existing off-the-shelf (NEC/UL) approved commercial devices or newly designed parts.
Retrofit design that provides clearance to ensure that minimum wire turn/bend radius is not exceeded.

Ferrule device to reduce wire fraying and to ensure adequate metal-to-metal electrical contact surface.

Retrofit design that requires no physical modification to the existing power panel, that maintains original wiring integrity, and that minimizes both re-inspection requirements and re-inspection time.

New-construction design that incorporates regular NEC/UL approved components.

Preformed connector to eliminate retrofit minimum turn/bend wire requirements.

Swivel device that reduces or eliminates turn/bend radius restrictions and reduces installation time.

Back-plate design that complies with NEC/UL requirements and prevents incorrect installation.

Certain modifications and improvements will occur to those skilled in the art upon a reading of the foregoing description. All such modifications and improvements have been deleted herein for the sake of conciseness and readability but are properly within the scope of the following claims.

For example, certain voltages are recited herein. Those of ordinary skill in the art will understand that equipment designed to handle other voltages is within the scope of the invention. Also, while the invention has been described as being made with circuit breakers, simple, non-current-limiting switches can be substituted. Also, for 3-pole power, the number of poles of the circuit or switch can be increased as needed.

We claim:

1. A power transfer device comprising:
   a first multiple pole switch comprising:
      at least two pairs of opposing terminals; and
      a switch mechanism movable in a first direction to produce an electrical connection between the terminals of each pair;
   a second multiple pole switch comprising:
      at least two pairs of opposing terminals; and
      a switch mechanism movable in a second direction substantially opposite the first direction to produce an electrical connection between the terminals of each pair; and
   a coupler between the switch mechanisms moving the switch mechanisms in the same direction to close circuits of one of the switches and open circuits of the other switch with a period of time during coupler movement that all of the electrical connections are open; and
   electrical connections to each switch including a hot line and a ground line.

2. The power transfer device according to claim 1 further comprising:
   a main power source;
   a power cable from the main power source connected to a terminal of one of the opposing pairs of terminals of the first switch;
   a power cable from the main power source connected to a terminal of one of the opposing pairs of terminals of the first switch; and
   a neutral or common cable from the main power source connected to one of the opposing pairs of terminals of the first switch.

3. The power transfer device according to claim 2 further comprising:
   an electrical load;
   a cable from the electrical load connected to the other terminal of the pair to which the one of the power cables from the main power source is connected;
   a cable from the electrical load connected to the other terminal of the pair to which the other of the power cables from the main power source is connected; and
   a cable grounded at one end connected to the other terminal of the pair to which the neutral cable from the main power source is connected.

4. The power transfer device according to claim 3 further comprising:
   an auxiliary power source;
   a power cable from the auxiliary power source connected to a terminal of one of the opposing pairs of terminals of the second switch;
   a power cable from the auxiliary power source connected to a terminal of one of the opposing pairs of terminals of the second switch; and
   a neutral cable from the auxiliary power source connected to a terminal of one of the opposing pairs of terminals of the adjacent multiple pole circuit breaker.

5. The power transfer device according to claim 4 further comprising:
   an electrical conductor connected at one end to the terminal of the first switch opposing the terminal to which the neutral or common cable from the main power source is connected, and at its distal end to the terminal of the second switch opposing the terminal to which the neutral or common cable from the auxiliary power source is connected;
   an electrical conductor connected at one end to one of the terminals of the first switch opposing a terminal to which one of the power cables from the main power source is connected, and at its distal end to one of the terminals opposing a terminal of the second switch to which one of the power cables from the auxiliary power source is connected; and
   an electrical conductor connected at one end to the other of the terminals of the first switch opposing a terminal to which one of the power cables from the main power source is connected, and at its distal end to one of the terminals opposing a terminal of the second switch to which the other of the power cables from auxiliary power source is connected.

6. A power transfer device comprising:
   an electrical load;
   an auxiliary power source;
   a power transfer device comprising:
      a first three pole circuit breaker comprising a first breaker switch movable in a first direction to produce an electrical connection from at least a hot and ground line of a main power source to the electrical load between three opposing pairs terminals;
      a second three pole circuit breaker comprising a second breaker switch movable in a second direction substantially opposite the first direction to produce an electrical connection from at least a hot and a ground line of the auxiliary power source to the electrical load between each of the three opposing pairs of terminals of the second breaker; and
      a coupler between the first and second breaker switches movable to produce an electrical connection between the first breaker and terminate an electrical connection between the second breaker such that there is a period of time during movement of the coupler that all lines are open.

7. The power transfer device of claim 6 further comprising:
   a main power source;

a first power cable from the main power source connected to a first line terminal of the first circuit breaker of the power transfer device;

a second power cable from the main power source connected to a second line terminal of the first circuit breaker of the power transfer device; and a ground cable from the main power source connected to a ground terminal of the first circuit breaker of the power transfer device.

8. The power transfer device of claim 7 further comprising:

a power cable from the auxiliary power source connected to a first line terminal of the second circuit breaker of the power transfer device;

a power cable from the auxiliary power source connected to a second line terminal of the second circuit breaker of the power transfer device; and a cable connected to a ground terminal of the second circuit breaker of the power transfer device.

9. The power transfer device of claim 8 further comprising:

a power cable from the electrical load connected to a first load terminal of the second circuit breaker of the power transfer device;

a power cable from the electrical load connected to a second load terminal of the second circuit breaker of the power transfer device; and a ground cable connected to a third load terminal of the second circuit breaker of the power transfer device.

10. The power transfer device of claim 9 further comprising:

an electrical conductor connected at one end to a first load terminal of the first circuit breaker and at its distal end to a first line terminal of the second circuit breaker;

an electrical conductor connected at one end to a second load terminal of the second circuit breaker and at its distal end to a second line terminal of the second circuit breaker; and an electrical conductor connected at one end to a third load terminal of the first circuit breaker and at its distal end to a third line terminal of the second circuit breaker.

11. A power system comprising:

a power transfer device comprising:

a mounting pan affixed to a back wall of a housing;

a first three pole circuit breaker affixed to the mounting pan comprising:

three line terminals at one end, each line terminal opposing a corresponding one of three load terminal at an opposite end of the breaker; and a breaker switch movable in a first direction to produce an electrical connection between each of the terminals at the one end and its corresponding terminal at the opposite end of the breaker and movable in a second direction to terminate an electrical connection between each of the terminals at the one end and its corresponding terminal at the opposite end of the breaker;

a second three pole circuit breaker affixed to the mounting pan adjacent the first three pole breaker comprising:

three line terminals at one end, each line terminal opposing a corresponding one of three load terminal at an opposite end of the breaker;

a breaker switch disposed slightly offset from lateral to the other switch and movable in the second direction opposite the first direction to produce an electrical connection between each of the terminals at the one end and its corresponding terminal at the opposite end of the breaker and movable in the first direction to terminate an electrical connection between each of the terminals at the one end and its corresponding terminal at the opposite end of the breaker; and a coupler connecting the breaker switches of the three pole circuit breakers comprising:

a pair of opposing brackets affixed to the mounting pan, each bracket positioned laterally aside one of the circuit breakers;

a pair of opposing arms, each pivotally connected to one of the opposing brackets and each comprising:

an upwardly extending portion;

a substantially planar rectangular portion at a top of the arm extending substantially perpendicular to the upwardly extending portion and comprising a pair of indicators, one of the pair of indicators to mark an ON and the other to mark an OFF direction of the nearest of the breaker switches;

a pair of bars, each coupled to one of the pair of arms at one end and the other of the pair of arms at a distal end and extending transverse the opposing terminals of the circuit breakers and providing an opening between the pair of bars with the breaker switches disposed therein;

a handle connected at each end to the pair of bars and comprising a body portion and a pair of opposing legs connected at opposite ends of the body portion, each leg extending from its connection to the body portion to the pair of bars;

a main power source;

a power cable from the main power source connected to a line terminal of the first three pole circuit breaker;

a power cable from the main power source connected to a line terminal of the first three pole circuit breaker;

a ground cable from the main power source connected to a line terminals of the first three pole circuit breaker;

an electrical load;

a power cable from the electrical load connected to a load terminal of the first three pole circuit breaker opposing a line terminal to which one of the power cables from the main power source is connected;

a cable from the electrical load connected to a load terminal of the first three pole circuit breaker opposing the line terminal to which the other of the power cables from the main power source is connected;

a cable grounded at one end connected at a distal end to the load terminal of the first three pole circuit breaker opposing the line terminal to which the ground cable from the main power source is connected;

an auxiliary power source;

a power cable from the auxiliary power source connected to a line terminal of the second three pole circuit breaker;

a power cable from the auxiliary power source connected to a line terminal of the second three pole circuit breaker;

a ground cable from the auxiliary power source connected to a line terminal of the second three pole circuit breaker;

a cable connected at one end to the load terminal of the first three pole circuit breaker opposing the line terminal to which the ground cable from the main power source is connected in common with the grounded cable connected thereto, and at its distal end to the load terminal of the second three pole circuit breaker opposing the line terminal to which the ground cable from the auxiliary power source is connected;

a cable connected at one end to the load terminal of the first three pole circuit breaker opposing the line terminal to which one of the power cables from the main power source is connected in common with the cable from the electrical load connected thereto, and at its distal end to the load terminal of the second three pole circuit breaker opposing a line terminal to which one of the power cables from the auxiliary power source is connected; and a cable connected at one end to the load terminal of the first three circuit breaker opposing the line terminal to which the other of the power cables from the main power source is connected in common with the cable from the electrical load connected thereto, and at its distal end to the load terminal of the second three pole circuit breaker opposing the line terminal to which the other of the power cables from auxiliary power source is connected.

12. An isolation switch for a power transfer device comprising:

first and second switches disposed with lateral sides adjacent one another, each switch having a sufficient number of poles to convey power, neutral and ground from power supply to a load, and a linkage between the first and second switches configured to close one switch and open the other switch substantially simultaneously, with a period of time when all poles of both switches are open.

13. An isolation switch as claimed in claim 12, wherein the number of poles for each switch is five, so that three phase power, neutral and ground poles are provided.

14. A method of transferring electrical power supplies from a main utility supply to an auxiliary supply comprising:

supplying electrical power to an electrical load from a main utility supply through a first switch having poles for a hot line and at least one grounded line;

providing an auxiliary electric power supply available for connection to the electrical load through a second switch having poles for a hot line and at least one grounded line, the second switch being mechanically coupled to the first switch so that opening the poles of one switch closes the poles of the other switch; and opening the poles of the first switch and thereby closing the poles of the second switch with a period of time during such opening and closing when all of the poles of the switches are open, including opening a grounded line to the main utility supply and closing a grounded line to the auxiliary electric power supply, thereby completely isolating the main utility from the auxiliary electric power supply.

15. A method as claimed in claim 14 wherein opening the poles of the first switch and thereby closing the poles of the second switch is actuated by hand.

16. A method as claimed in claim 14 wherein opening the poles of the first switch and thereby closing the poles of the second switch include opening and closing three hot lines through the two switches for three phase power.

* * * * *